United States Patent [19]

Bacardit

[11] Patent Number: 4,790,793

[45] Date of Patent: Dec. 13, 1988

[54] RESILIENT DEVICE FOR THE CENTERING AND COUPLING WITH BACKLASH OF TWO ROTARY COMPONENTS

[75] Inventor: Juan S. Bacardit, Barcelona, Spain

[73] Assignee: Bendix Espana S.A., Barcelona, Spain

[21] Appl. No.: 53,213

[22] Filed: May 21, 1987

[51] Int. Cl.[4] .......................... B62D 5/08; F16D 3/50
[52] U.S. Cl. ........................................ 464/77; 464/160
[58] Field of Search ...................... 267/150, 154, 182; 411/517, 518, 520, 521, 522; 464/51, 77, 160

[56] References Cited

U.S. PATENT DOCUMENTS

| | | | |
|---|---|---|---|
| 1,743,217 | 1/1930 | Hornbostel | 464/77 |
| 2,841,000 | 7/1958 | Parks et al. | 464/77 |
| 3,984,998 | 10/1976 | Rogakos et al. | 464/77 |
| 4,693,123 | 9/1987 | Bacardit | 73/862.33 |

FOREIGN PATENT DOCUMENTS 77710  4/1983  European Pat. Off. .............. 464/77

Primary Examiner—Daniel P. Stodola
Attorney, Agent, or Firm—Larry J. Palguta; Ken C. Decker

[57] ABSTRACT

The end zones (11) of the C-springs (9) of the resilient device for the centering and coupling with backlash of first (1) and second (7) coaxial rotary components form lugs (12) extending radially inward in order to cooperate with stop surfaces (15) in the first rotary component (1), and external shoulders (19) in order to cooperate with facing shoulders (18) formed in the inside wall (16) of the second rotary component (7), the shoulders (18) being angularly offset from the stop surfaces (15) and substantially contiguous with the latter in projection onto the median plane (M) of the device in the centered position of the rotary components (1, 7).

2 Claims, 1 Drawing Sheet

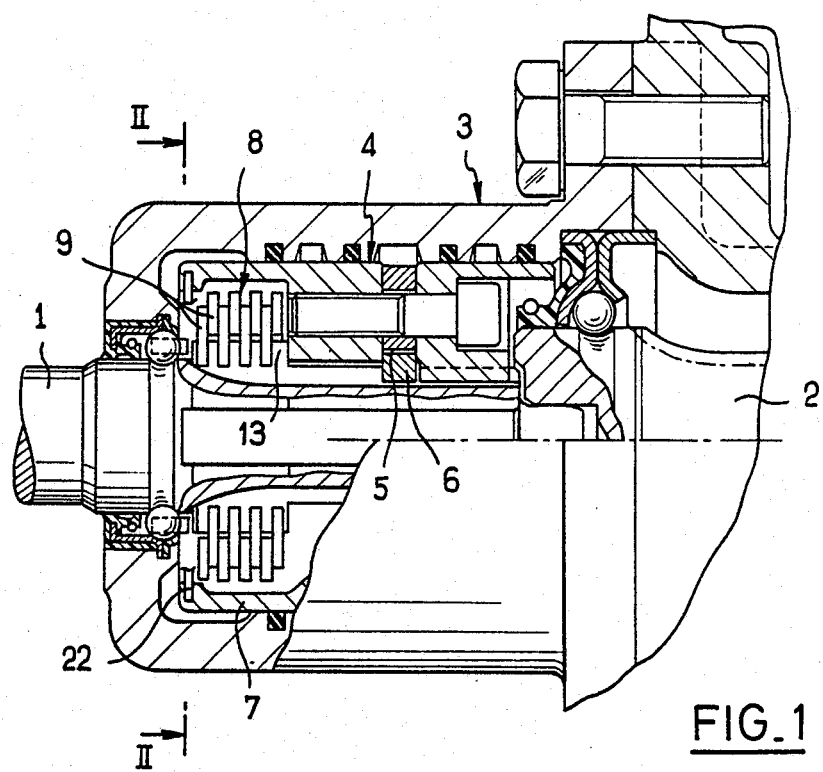
FIG_1
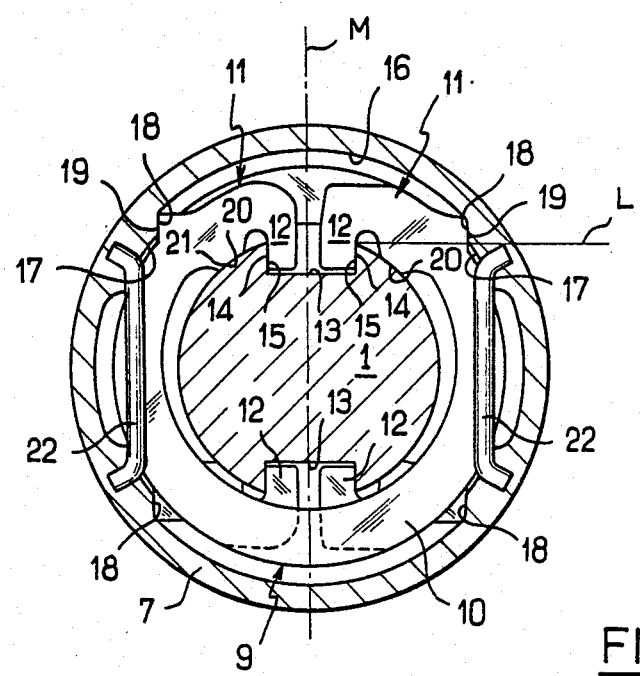
FIG_2

RESILIENT DEVICE FOR THE CENTERING AND COUPLING WITH BACKLASH OF TWO ROTARY COMPONENTS

This invention relates to resilient devices for the centering and coupling with backlash of first and second coaxial rotary components, the second rotary component having a part surrounding a part of the first component, said devices being of the type comprising at least one C-spring disposed substantially coaxially between said parts of the first and second rotary components and having two adjacent end zones substantially symmetrical in relation to a median plane and connected together by a partially annular body part, each end zone comprising a first and a second stop edge, these stop edges normally, when the first and second rotary components are in the centered position, cooperating with and bearing against respective first and second stop surfaces fastened respectively to said parts of the first and second rotary components, the first stop edges being formed by end lugs extending substantially radially in the inward direction and received in an external cavity which is formed in said part of the first rotary component and whose mutually opposite faces form the first stop surfaces.

A resilient device of this type for centering and coupling with backlash is described in document Bacardit et al. U.S. Pat. No. 4,660,459, particularly in connection with FIG. 10 of that document. In this arrangement, as described in this document, the second stop edges are formed by lugs extending radially towards the outside of the end zones of the C-springs and received in a radial aperture in the part of the second rotary component surrounding the first rotary component, the first and second stop surfaces being substantially coplanar in pairs and spaced radially apart by a relatively great distance, in an arrangement which during operation entails the risk of the displacement, and particularly the twisting, of the C-spring through the action of moments resulting from the action and reaction forces offset between the outer and inner lugs of the end zones of the C-spring.

The present invention seeks to provide improvements to the resilient devices for centering and coupling with backlash of the type referred to, which minimize the abovementioned undesirable effects, ensure correct centering and positioning of the C-spring, and enable the best possible use to be made of the functional characteristics of the C-spring, in a compact, robust arrangement entailing low manufacturing costs.

In order to do this, according to one characteristic of the invention, each second stop edge of the C-spring is formed by an external shoulder at the connection between the corresponding end zone and the body part of the spring, the shoulder being angularly offset from the corresponding first stop edge of the same end zone of the C-spring, the second stop surfaces being formed face to face in the inside wall of said part of the second rotary component which surrounds the first rotary component.

More specifically, according to one particular characteristic of the invention, in the centered position of the first and second rotary components the first and second stop surfaces of each end zone of the C-spring are substantially contiguous in projection onto the median plane, and are advantageously parallel to the latter.

Other characteristics and advantages of the present invention will emerge from the following description of one embodiment given by way of illustration but without in any way constituting a limitation, this description being given with reference to the accompanying drawings, in which:

FIG. 1 is an elevation, partly in longitudinal section, of a rotary hydraulic distributor utilizing a resilient device for centering and coupling with backlash according to the invention, and FIG. 2 is a view in cross-section in the sectional plane II—II in FIG. 1.

In FIG. 1 can be seen a rotary hydraulic distributor, more particularly for power-assisted steering systems, of the type described in document EP-A No. O 095 415 in the name of the Applicants, and comprising an input shaft 1 intended to be coupled to a steering wheel, and a coaxial output shaft 2 intended to drive a rack, the two shafts 1 and 2 being supported for coaxial rotation in a steering box 3, in which is rotatably mounted a distribution valve stator assembly given the general reference 4 and coupled for rotation with the output shaft 2, an internal discoidal cavity 5 being provided therein and containing a star-shaped distribution valve rotor 6 coupled for rotation with the input shaft 1. Between the input shaft 1 and an axial extension 7 of the valve stator assembly 4 a resilient device 8 for centering and coupling with backlash according to the invention is disposed, this device consisting of a series of juxtaposed C-springs 9 placed alternately in opposition, these C-springs 9 thus effecting the centering in the position of rest of the input shaft 1 and output shaft 2 (and consequently of the distributor components 5 and 4), while also producing, on a limited relative rotational displacemrnt of the shaft 1 in relation to the shaft 2, first a reaction on the shaft 1 opposing this rotational displacement and then, beyond a determined angular displacement, rotational coupling between the two shafts 1 and 2 as the end zones of the springs come to bear against one another.

As can clearly be seen in FIG. 2, each C-spring 9 comprises a body part 10 in the form of an annular sector, extended by two adjacent end zones 11 separated from one another and substantially symmetrical in relation to a median plane M. Each end zone 11 terminates in a lug 12 extending substantially radially inwards and received in a longitudinal slot 13 formed in the shaft 1 (or in a component fastened to the latter). The lugs 12 are mounted under initial stress in the slot 13, with their opposed edges 14 in resilient engagement with the opposite parallel side faces 15 of the slot 13, which are symmetrical in relation to the median plane M in the position of rest shown in the drawing.

The inside wall 16 of the extension 7 has a generally circular profile, but has at least one pair, and typically two pairs, of zones offset radially inwards and forming cylindrical surface portions 17 having a radius slightly greater than the outside radius of the adjacent zone of the body part 10 of the spring 9 at its junction with the corresponding end zone 11, each of them terminating on one side in a shoulder 18 which in the centered position of rest of the rotary components 1 and 7 is parallel to the median plane M and therefore to the faces 15 of the slot 13. For the symmetrical mounting of a plurality of alternating C-springs, the shoulders 18 are composed of planar longitudinal spot facings broached in the inside wall 16.

Each end zone 11 of the spring 9 forms on the outside, at its external junction with the adjacent portion of the body part 10, an external shoulder 19 which comes to bear against the previously mentioned shoulder 18 in the inside wall 16 of the second rotary component 7 and has on the inside a portion extending radially inwards to define an internal cylindrical surface 20 whose radius is very slightly greater than the radius of the adjacent outside surface 21 (adjoining the slot 13) of the shaft 1 (or of the component in which the slot 13 is formed.) As can clearly be seen in FIG. 2, with an arrangement of this kind the C-spring 9 is perfectly centered and positioned between the two rotary components 1 and 7 with, in the centered position of rest shown, the edges 14 in engagement contact with the faces 15 of the slot 13 and with the external shoulders in engagement contact with the shoulders 18 in the inside wall 16 of the second rotary component 7. According to one aspect of the invention the faces 15 and the shoulders 18 are contiguous in projection onto the median plane M, as is illustrated by the junction line L, and may even partially overlap in projection onto the median plane M, depending on requirements, in an arrangement which thus effects alignment between the action and reaction forces exerted on the end zones of the spring during the relative displacement of the shaft 1 in relation to the shaft 2, thereby avoiding, in accordance with the object of the invention, the problems of adaptation movements of the C-spring on its operation, In order to ensure axial securing of the different springs 9 in the resilient centering and coupling device 8, one or two metal pins 22 will be inserted into the inside wall of the extension 7 at its free end.

The C-springs 9 are typically produced by stamping from metal blanks, for example of steel, and in order to enable the springs to have a substantially linear elastic response the body part 10 of each spring advantageously has an evolutive radial thickness increasing from the end zones 11 to the diametrically opposite central portion.

Although the present invention has been described in connection with one particular embodiment, it is not limited thereby, but on the contrary may be the subject of modifications and variants which will occur to those versed in the art. In particular, the resilient device for centering and coupling with backlash according to the invention can be used in other fields apart from hydraulic distributors, for example in torque detector devices of the kind described in Barcardit U.S. Pat. No. 4,693,123.

I claim:

1. A resilient device for the centering and coupling with backlash of coaxial first and second rotary components, the second rotary component having a part surrounding a part of the first rotary component, said device being of the type comprising at least one C-spring disposed substantially coaxially between said parts of the first and second rotary components and having two adjacent end zones substantially coaxially between said parts of the first and second rotary components and having two adjacent end zones substantially symmetrical in relation to a median plane and connected together by a partially annular body part, each end zone comprising a first and a second stop edge, the stop edges normally, when the first and second rotary components are in a centered position, cooperating with and bearing against respective first and second stop surfaces disposed respectively at said parts of the first and second rotary components, the first stop edges being formed by end lugs extending substantially radially in an inward direction and received in an external cavity which is formed in said part of the first rotary component and whose mutually opposite faces form the first stop surfaces, characterized in that each second stop edge is formed by an external shoulder at a connection between the end zone and the body part of the spring, said each second stop edge being in nonlinear alignment with and angularly offset from the associated first stop edge so as to be approximately parallel with one another, the second stop surfaces being formed opposite one another on an inside wall of said part of the second rotary component, the inside wall of said part of the second rotary component forming in an extension of each second stop surface a cylindrical surface whose radius is slightly greater than the outside radius of an adjacent zone of the body part of the C-spring, each end zone of the C-spring having an internally extending portion with a curved surface whose radius is slightly greater than the radius of an external surface of said part of the first rotary component and which adjoins the cavity, the device comprising a plurality of C-springs juxtaposed axially and placed alternately in opposition, the second stop surfaces for the springs being mutually coplanar, the juxtaposed C-springs held in position by at least one locking member mounted in said part of the second rotary component, and the locking member comprising a metal pin inserted into said part of the second rotary component.

2. The device according to claim 1, characterized in that the body part of the C-spring has an evolutive radial thickness.

* * * * *